United States Patent
Anami

(10) Patent No.: US 7,405,895 B2
(45) Date of Patent: Jul. 29, 2008

(54) RECORDING-REPRODUCING APPARATUS AND METHOD OF DETECTING DEW CONDENSATION IN RECORDING-REPRODUCING APPARATUS

(75) Inventor: Tomotaka Anami, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 11/711,280

(22) Filed: Feb. 27, 2007

(65) Prior Publication Data

US 2007/0206311 A1 Sep. 6, 2007

(30) Foreign Application Priority Data

Mar. 1, 2006 (JP) .............................. 2006-055009

(51) Int. Cl.
*G11B 15/18* (2006.01)
(52) U.S. Cl. .......................................... 360/69; 360/71
(58) Field of Classification Search ........................ None
See application file for complete search history.

(56) References Cited

U.S. PATENT DOCUMENTS

| | | | | |
|---|---|---|---|---|
| 5,384,672 A | * | 1/1995 | Kobayashi | 360/71 |
| 5,433,396 A | * | 7/1995 | Kusumi et al. | 242/338.1 |
| 5,461,520 A | * | 10/1995 | Kobayashi et al. | 360/71 |
| 5,481,418 A | * | 1/1996 | Maikuma et al. | 360/85 |
| 6,108,155 A | * | 8/2000 | Tanaka et al. | 360/71 |
| 6,137,649 A | * | 10/2000 | Saito et al. | 360/74.1 |
| 7,019,931 B2 | * | 3/2006 | Kano et al. | 360/69 |

FOREIGN PATENT DOCUMENTS

| | | | |
|---|---|---|---|
| JP | 2 285542 | | 11/1990 |
| JP | 5 20728 | | 1/1993 |
| JP | 07182723 A | * | 7/1995 |
| JP | 2549042 | | 8/1996 |
| JP | 3072523 | | 6/2000 |
| JP | 2001 126338 | | 5/2001 |
| JP | 2004 192713 | | 7/2004 |

* cited by examiner

*Primary Examiner*—Hoa T. Nguyen
*Assistant Examiner*—James L Habermehl
(74) *Attorney, Agent, or Firm*—Frommer Lawrence & Haug LLP; William S. Frommer

(57) ABSTRACT

A magnetic recording-reproducing apparatus having a rotary head drum around which a magnetic tape is wound for recording and reproducing signals on the magnetic tape, a tape loading mechanism, and a control unit for controlling rotation of the rotary head drum and operation of the tape loading mechanism. The control unit includes a monitoring unit that monitors rotational frequency of the rotary head drum at a tape loading operation, and a first determination unit that determines the presence of dew condensation. An operation unit terminates rotation of the rotary head drum and conducts the tape unloading operation using the tape loading mechanism. A second determination unit restarts the tape loading operation using the tape loading mechanism. A stop control unit stops rotation of the rotary head drum and disables the tape unloading operation using the tape loading mechanism.

2 Claims, 8 Drawing Sheets

RECORDING-REPRODUCING APPARATUS AND METHOD OF DETECTING DEW CONDENSATION IN RECORDING-REPRODUCING APPARATUS

CROSS REFERENCES TO RELATED APPLICATIONS

The present invention contains subject matter related to Japanese Patent Application JP 2006-055009 filed in the Japanese Patent Office on Mar. 1, 2006, the entire contents of which being incorporated herein by reference.

BACKGROUND OF THE INVENTION

1. Field of the Invention

The present invention relates to a magnetic recording-reproducing apparatus using a helical scan system for recording and reproducing data on a magnetic tape by winding the magnetic tape around a rotary head drum, and also relates to a method of detecting dew condensation in the magnetic recording-reproducing apparatus.

2. Description of the Related Art

In a magnetic recording-reproducing apparatus using a helical scan system for recording and reproducing data on a magnetic tape by winding the magnetic tape around a rotary head drum, dew condensation may be observed on the rotary head drum when the magnetic recording-reproducing apparatus using a helical scan system is moved in a place with high temperature and high humidity. The magnetic tape is sometimes stuck on the rotary head drum to damage or break the magnetic tape or the rotary head drum when winding the magnetic tape around the rotary head drum with dew condensation. Therefore, dew condensation that may form on the rotary head drum may accurately be detected in advance and winding operation of the magnetic tape around the rotary head drum may adequately be controlled.

Dew condensation detection is generally conducted by locating a dew condensation sensor around the rotary head drum which indirectly detects the rotary head drum condition using the dew condensation sensor.

With such dew condensation detecting method employing such dew condensation sensor; however, the current state of the rotary head drum cannot accurately be detected since longer time would take to detect the dew condensation when a temperature drastically changes.

Japanese Unexamined Patent Publication No. 2004-192713 discloses an example of a recording-reproducing apparatus capable of detecting dew condensation formed on a rotary head drum in real time. According to such a recording-reproducing apparatus, dew condensation is detected by the following manner: a magnetic tape slightly contacts a rotary head drum before winding the magnetic tape completely around the rotary head drum; if dew condensation has been formed on the rotary head drum, there may be a change in the rotational frequency of the rotary head drum. Thus, it is possible to determine whether or not dew condensation is formed on the rotary head drum by detecting a change in the frequencies of the rotary head drum. When dew condensation has been detected on the rotary head drum, the magnetic tape will be unloaded from the rotary head drum.

However, in the dew condensation detecting method according to the related art, if dew condensation has not been detected from the rotary head drum with having the magnetic tape slightly contacting the rotary head drum, dew condensation may still be formed on the rotary head drum while a subsequent tape-loading operation is conducted. Thus, since the related art method cannot detect the above-described dew condensation, it is difficult to reliably prevent the magnetic tape or the rotary head drum from being damaged or broken.

SUMMARY OF THE INVENTION

In view of the aforementioned aspects, the present invention intends to provide a recording-reproducing apparatus in which dew condensation formed on a rotary head drum can be detected to prevent a magnetic tape or a magnetic head drum from being either damaged or broken with a higher probability and a reliability.

According to an embodiment of the present invention, there is provided a magnetic recording-reproducing apparatus including a rotary head drum around which a magnetic tape is wound for recording and reproducing signals on the magnetic tape, a tape loading mechanism including a tape loading operation that winds the magnetic tape around the rotary head drum and a tape unloading operation that unwinds the magnetic tape from the rotary head drum, a control unit for controlling rotation of the rotary head drum and operation of the tape loading mechanism.

Further, there are provided the control unit a monitoring unit that monitors rotational frequency of the rotary head drum at a tape loading operation, a first determination unit that determines presence of dew condensation when rotational frequency of the rotary head drum is equal to or less than the prescribed value with a state where tape loading operation is conducted to a position at which the magnetic tape slightly contacts the rotary head drum, an operation unit that stops rotation of the rotary head drum when the operation unit determines the presence of dew condensation and that conducts the tape unloading operation using the tape loading mechanism, a second determination unit that restarts the tape loading operation using the tape loading mechanism when the first determination unit determines the absence of dew condensation and that determines the presence of dew condensation using continuous decrease rates of rotational frequency and renewal rates of the highest rotational frequency of the rotary head drum during the tape loading operation, and a stop control unit that controls to stop rotation of the rotary head drum when the second determination unit determines the presence of dew condensation and that controls to disable the tape unloading operation using the tape loading mechanism.

In the recording-reproducing apparatus according to an embodiment of the present invention, since dew condensation is detected in a multiplex manner, there may be a high probability in detecting the presence of dew condensation. Further, since the magnetic tape unloading operation can be controlled in accordance with the detected outcome of dew condensation, damage to the magnetic tape or the rotary head drum can almost completely be prevented.

DESCRIPTION OF THE PREFERRED EMBODIMENTS

Embodiments of the present invention will be described below in detail with reference to drawings.

Figure 1:
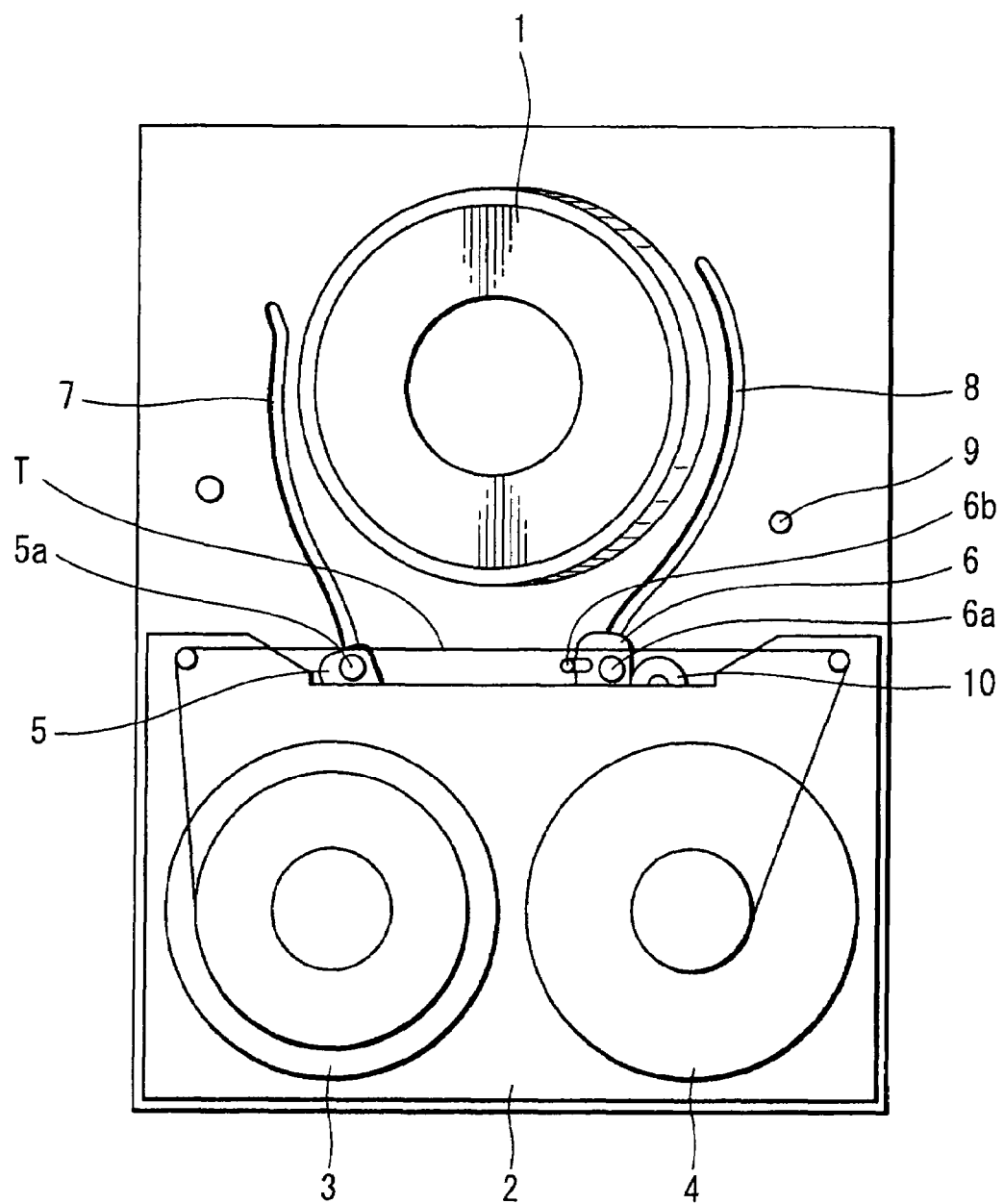
FIG. 1 is a diagram showing an arrangement of a tape travel system in a recording-reproducing apparatus illustrating a state before a magnetic tape is loaded on a rotary head drum.
Figure 2:
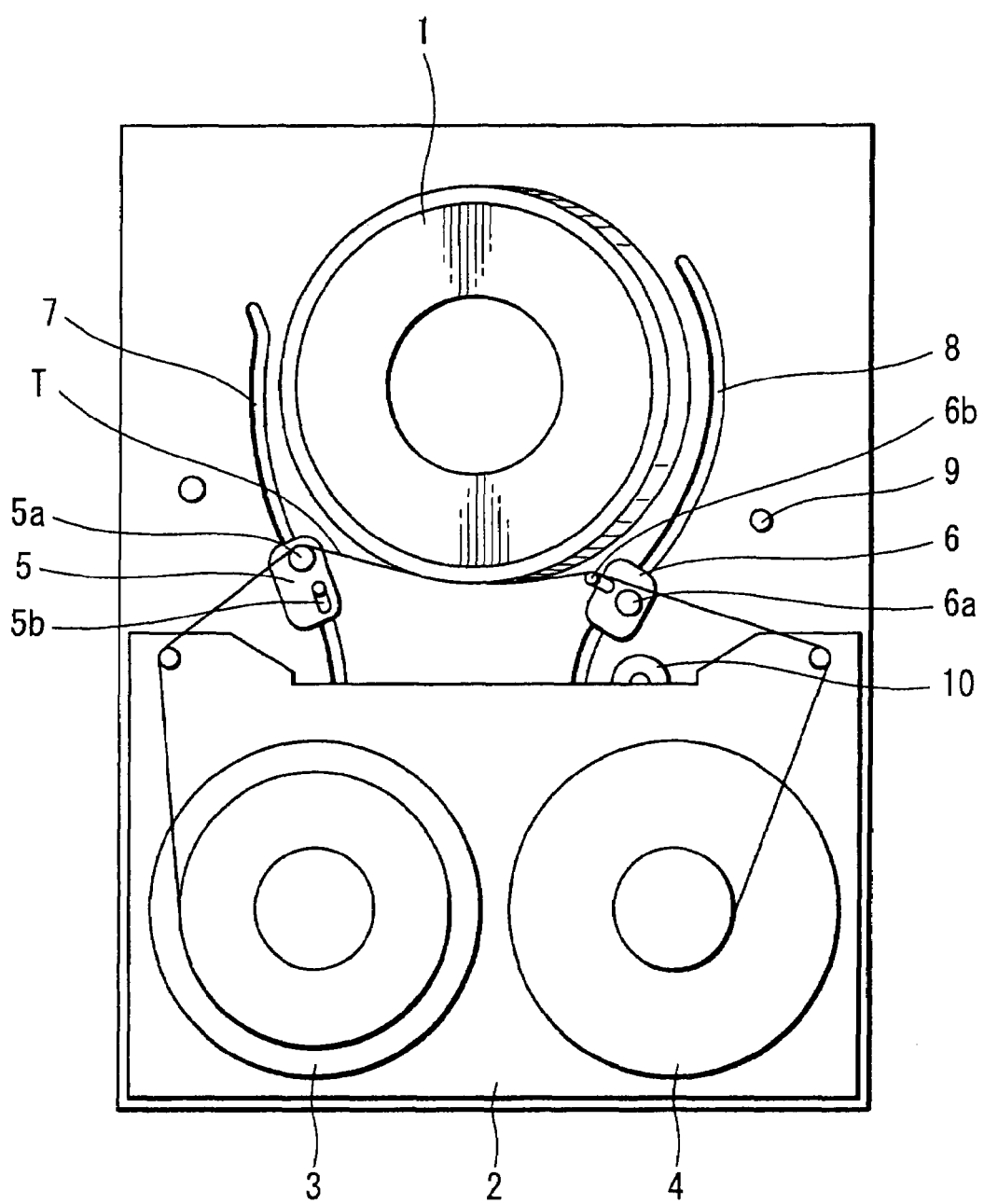
FIG. 2 is a diagram showing the arrangement of the tape travel system in the recording-reproducing apparatus illustrating a state in which the magnetic tape slightly contacts the rotary head drum during the tape loading operation.
Figure 3:
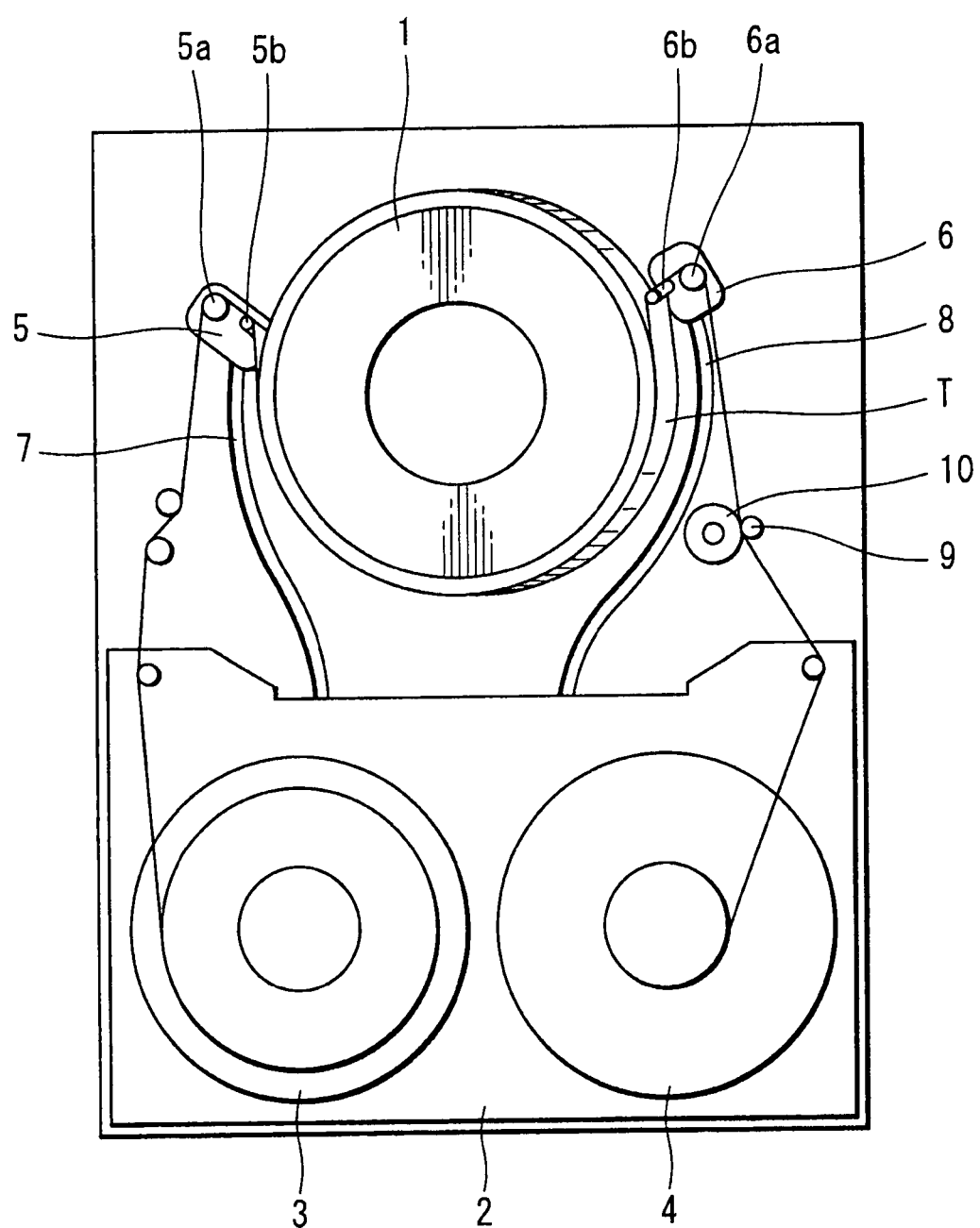
FIG. 3 is a diagram showing the arrangement of the tape travel system in the recording-reproducing apparatus illustrating a state in which the tape loading operation is completed with the magnetic tape fully wound around the rotary head drum.

FIGS. 1 to 3 are a diagram showing an arrangement of a tape travel system in a recording-reproducing apparatus. More specifically, FIG. 1 illustrates a state before a magnetic tape is loaded on a rotary head drum, FIG. 2 illustrates a state in which the magnetic tape slightly contacts the rotary head drum during the tape loading operation and FIG. 3 illustrates a state in which the tape loading operation is completed with the magnetic tape fully wound around the rotary head drum.

In the above arrangement according to embodiments of the present invention, the numeral 1 indicates a rotary head drum that records and reproduce data on the magnetic tape T, and the numeral 2 indicates a tape cassette that contains the magnetic tape T. As illustrated, the tape cassette 2 incorporates a supply reel 3 and a wind-up reel 4, around each of which the magnetic tape T is wound. A tape travel path is formed such that the magnetic tape T is unwound from the supply reel 3, drawn to the top surface of the tape cassette 2 and re-wound around the wind-up reel 4.

In the recording-reproducing apparatus, a tape loading operation for winding the magnetic tape T around the rotary head drum 1 and a tape unloading operation for unwinding the magnetic tape T from the rotary head drum 1 are carried out by using a tape loading mechanism formed on a mechanical deck.

The tape loading mechanism includes loading members 5, 6 provided with respective pairs of guide posts 5a, 5b and 6a, 6b to guide the magnetic tape T.

As the loading members 5 and 6 are moved from the respective positions shown in FIG. 1 to the positions shown in FIG. 3 along guide grooves 7, 8 formed at both sides (left and right) of the rotary head drum 1, the magnetic tape T is drawn from the tape cassette 2 and wound around the rotary head drum 1. Then, the magnetic tape T travels such that the magnetic tape T is re-wound around the wind-up reel 4 with rotating capstans 9 and pinch roller 10, thereby enabling the rotary head drum 1 to record signals on the magnetic tape T or to reproduce signals from the magnetic tape T.

When the magnetic tape T that is wound around the rotary head drum 1 is unloaded from the rotary head drum 1, the loading members 5, 6 may be returned from the positions shown in FIG. 3 to the positions shown in FIG. 1 along the guide grooves 7, 8 in the reverse manner of the tape loading operation. It should be noted that when the loading members 5, 6 return to the original positions, the wind-up reel 4 also rotates to wind the magnetic tape T in the tape unloading operation.

The aforementioned tape loading mechanism employs a loading motor as a power source thereof and carries out the aforementioned tape loading operation and tape unloading operation using gear mechanisms and cam mechanisms formed on the mechanical deck. However, this tape loading mechanism includes a typical arrangement generally known to persons skilled in the art; details thereof will be omitted herein.

Figure 4:
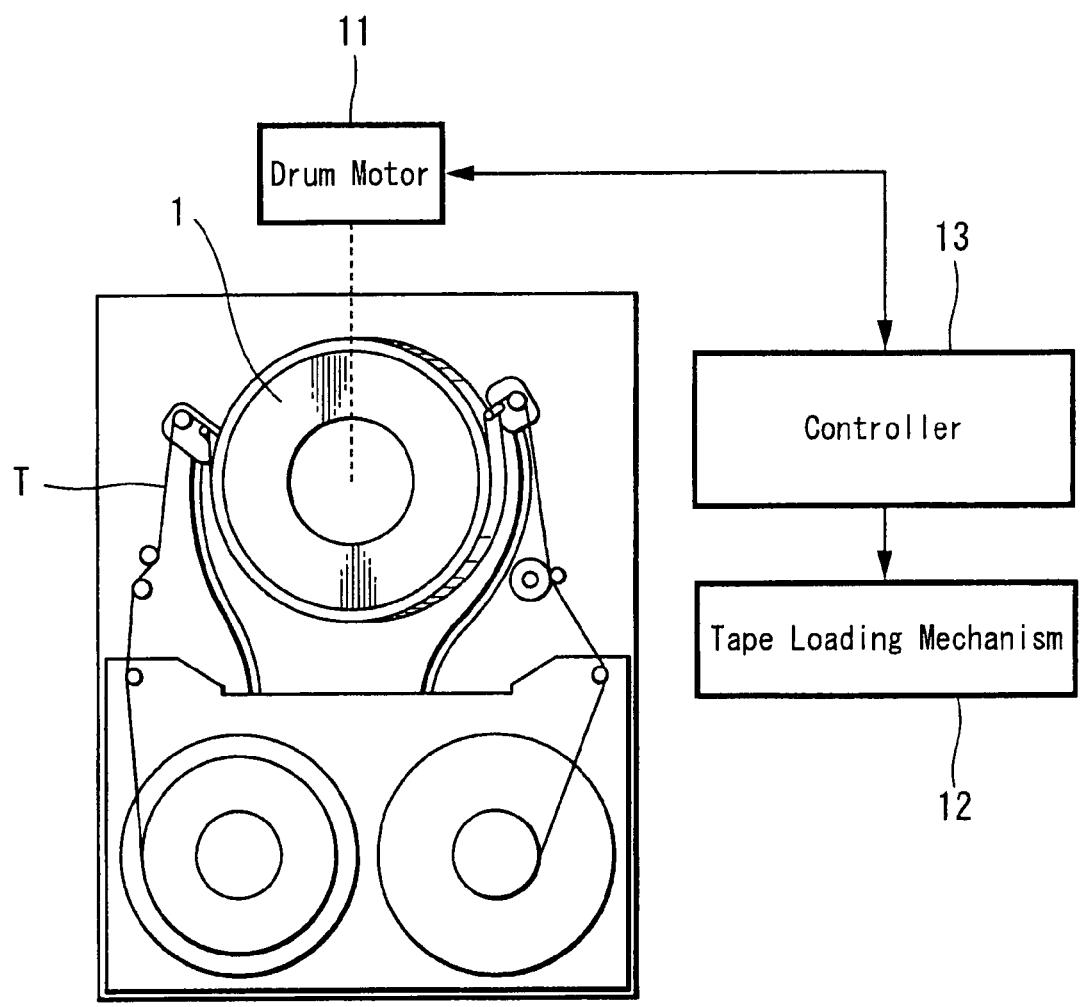
FIG. 4 is a diagram showing an arrangement illustrating detecting dew condensation in a recording-reproducing apparatus according to an embodiment of the present invention.

FIG. 4 shows an arrangement capable of detecting dew condensation in the rotary head drum 1 in the recording-reproducing apparatus according to an embodiment of the present invention including the above-mentioned arrangement. According to the arrangement, the recording-reproducing apparatus includes a controller 13, which might be used as a microprocessor, to control a drum motor 11 for rotating the rotary head drum 1 and to control a tape loading mechanism 12 for carrying out the tape loading operation and tape unloading operation.

The controller 13 controls to monitor rotational frequency of the rotary head drum 1 at a tape loading operation, to determine the presence of dew condensation (i.e., the magnetic tape stuck to the rotary head drum 1) when rotational frequency of the rotary head drum 1 is equal to or less than the prescribed value in a state where tape loading operation is conducted to a position at which the magnetic tape slightly contacts the rotary head drum 1 (FIG. 2). In addition, the controller 13 controls to stop rotation of the rotary head drum 1 when the operation unit determines the presence of dew condensation and to conduct the tape unloading operation using the tape loading mechanism 12. The controller 13 further controls to restart the tape loading operation using the tape loading mechanism when the first determination unit determines the absence of dew condensation and to determine the presence of dew condensation using continuous decrease rates of rotational frequency and renewal rates of the highest rotational frequency of the rotary head drum 1 during the tape loading operation (process of tape loading operation from FIG. 2 to FIG. 3). The controller 13 still further controls to stop rotation of the rotary head drum 1 when the second determination unit determines the presence of dew condensation, and to disable the tape unloading operation using the tape loading mechanism 12.

Figure 5:
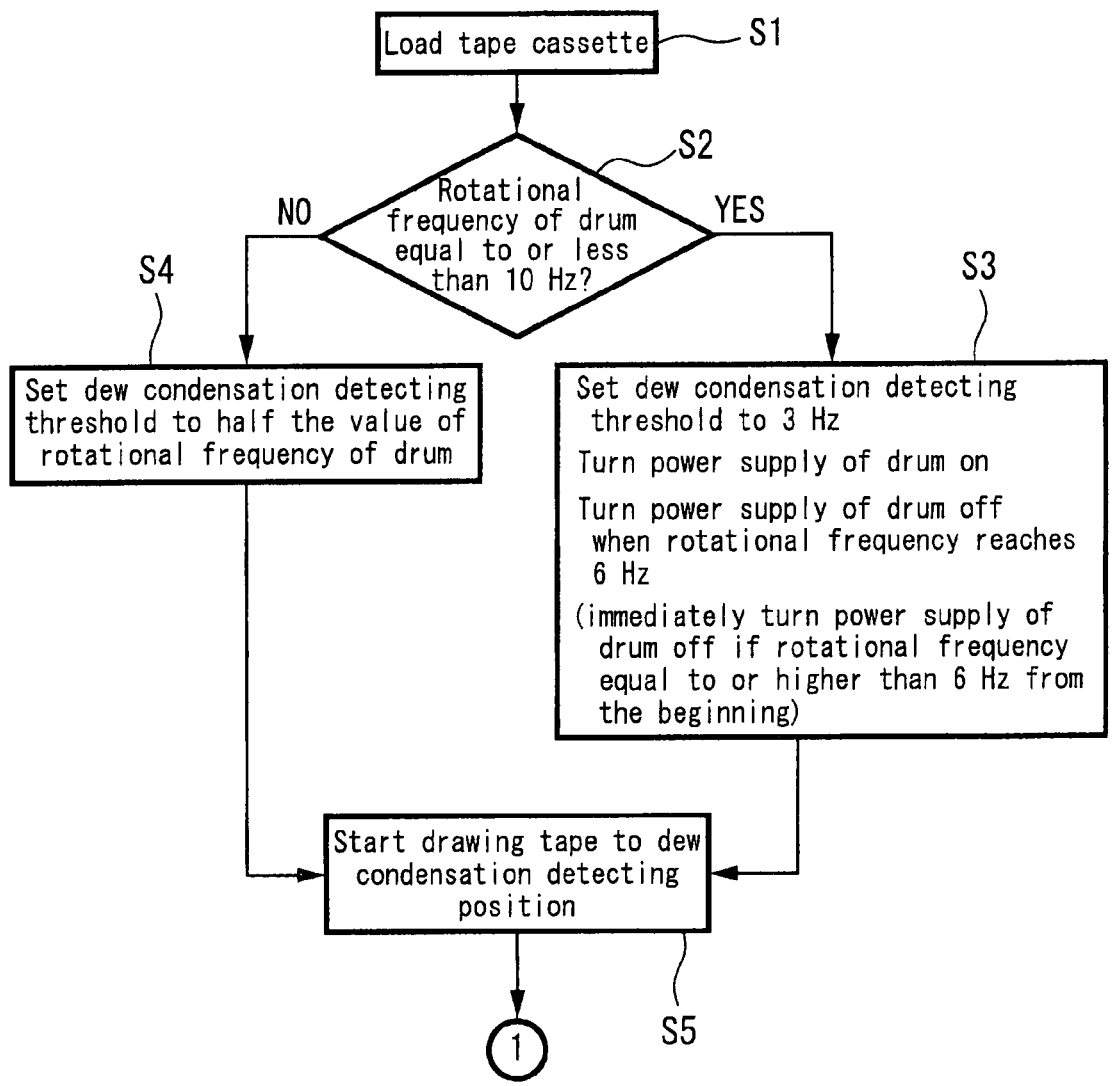
FIG. 5 is a flowchart illustrating steps of determining the threshold for determining the presence or the absence of dew condensation on rotary head drum in a recording-reproducing apparatus according to an embodiment of the present invention.
Figure 6:
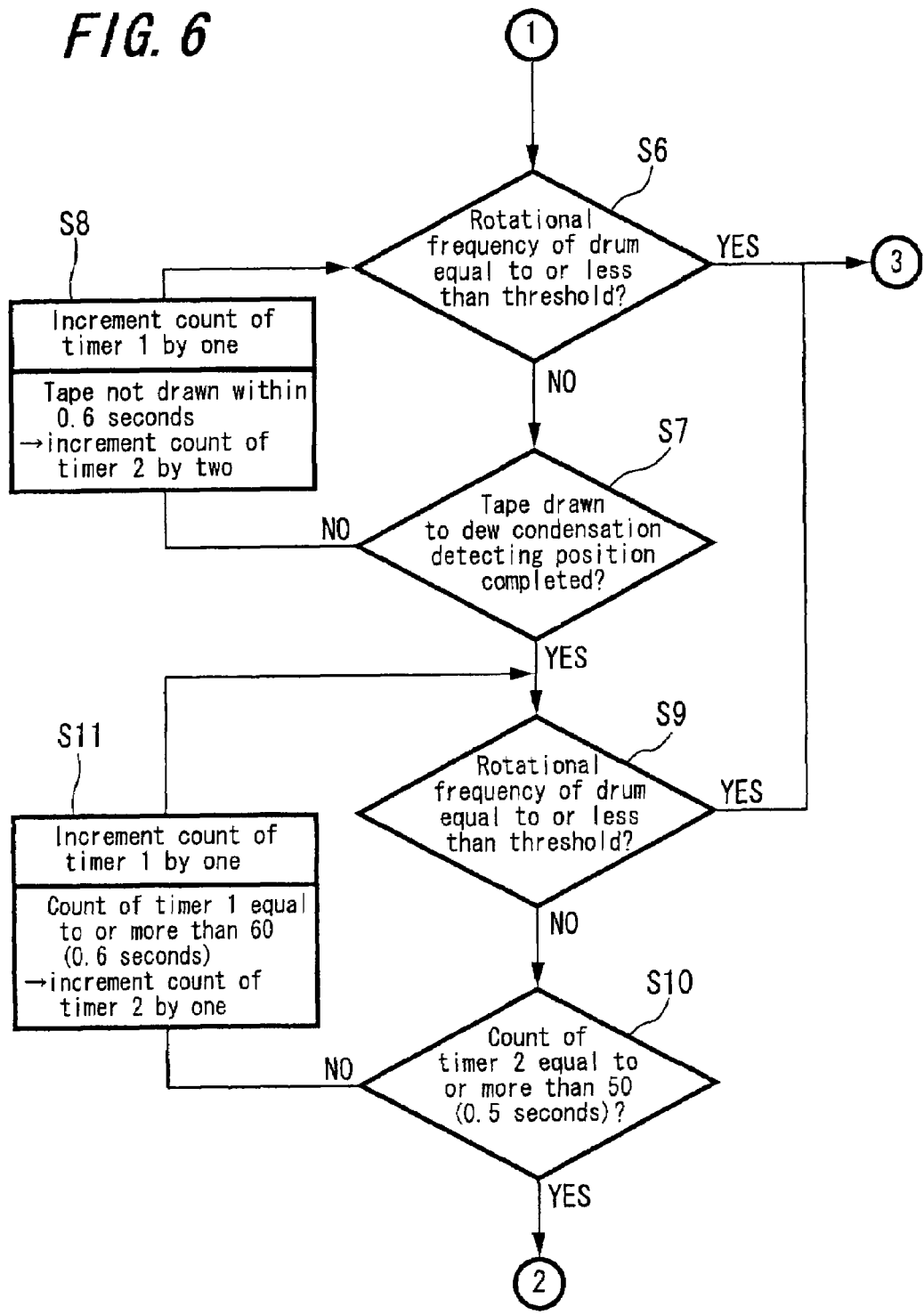
FIG. 6 is a flowchart for determining the presence or absence of dew condensation on rotary head drum in a recording-reproducing apparatus according to an embodiment of the present invention.
Figure 7:
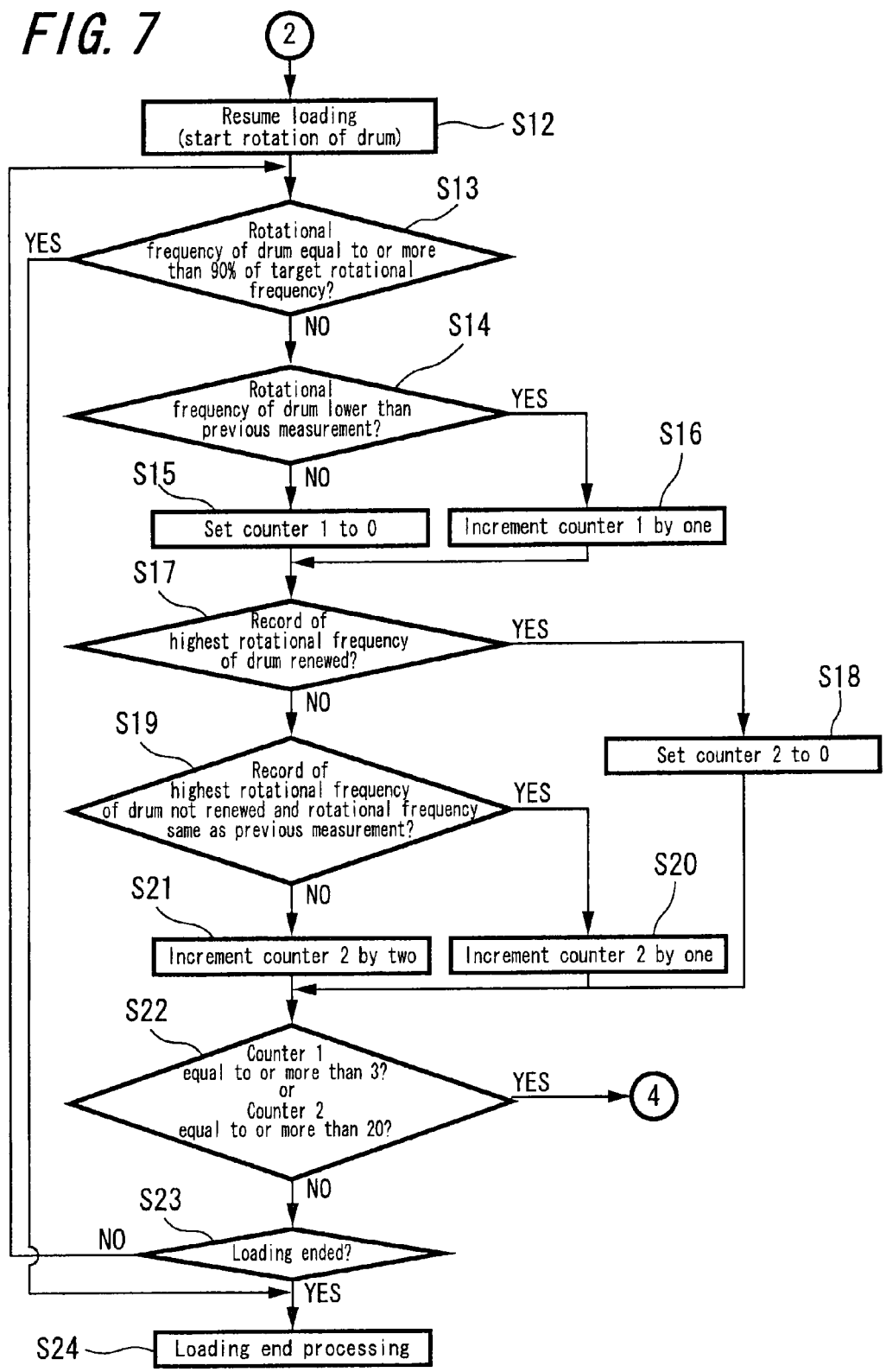
FIG. 7 is a flowchart for determining the presence or absence of dew condensation on rotary head drum in a recording-reproducing apparatus according to an embodiment of the present invention after the tape loading operation being resumed.

FIGS. 5 to 9 show detailed depictions of flows illustrating controls for detecting dew condensation. FIGS. 5 to 7 represent main flows illustrating steps of detecting dew condensation, each of which is repeated at a hundred cycles per second to determine the presence or the absence of dew condensation.

FIG. 5 represents a flow illustrating steps of determining the threshold for determining the presence or the absence of dew condensation. Specifically, when the tape cassette is loaded (step S1), whether or not the rotational frequency of the rotary head drum 1 is equal to or less than 10 Hz (10 rotations per second) is determined (step S2), and then the step will move either to step S3 or S4 based on the result.

At step S3 where the rotational frequency of the rotary head drum 1 is found to be equal to or less than 10 Hz, the threshold that determines the presence of dew condensation (i.e., the magnetic tape stuck to the rotary head drum 1) is set to 3 Hz. At step S3, if the rotational frequency of the rotary head drum 1 is less than 6 Hz, the power supply of the rotary head drum 1 is turned on to increase the rotational frequency, and if the rotational frequency of the rotary head drum 1 is equal to 6 Hz, the power supply is turned off. Or, if the rotational frequency of the rotary head drum 1 is found to be equal to or more than 6 Hz, the power supply is immediately turned off. On the other hand, at step S4 where the rotational frequency of the rotary head drum 1 is found to be neither equal to nor less than 10 Hz, the threshold to determine the presence or the absence of dew condensation is set to half the value of the rotational frequency of the rotation head drum when the tape cassette is loaded.

Then, after the step S3 or S4 is performed, the tape loading mechanism is operated to initiate the tape loading operation for drawing the magnetic tape 2 to the dew condensation detection position (position at which the magnetic tape 2 slightly contacts with the rotary head drum 1) (step S5).

In the flowchart shown in FIG. 5, the magnetic tape 2 is attempted to contact the rotary head drum 1 at the rotational frequency of approximately 8 Hz (power supply off state). The accelerating rotary head drum 1 with the power supply on starts decelerating once having reached a rotational frequency to some extent higher than the rotational frequency with the power supply off. Thus, in this case, the rotational frequency reaches beyond the peak of the acceleration when the power supply is turned off at 6 Hz, and then the magnetic tape T is attempted to contact the rotary head drum 1 at the rotational frequency of a little under 8 Hz when the rotational frequency starts decelerating.

At step S2 where the threshold condition for moving to step S4 or step S5 is determined, when the next tape cassette is inserted into the recording-reproducing apparatus immediately after the tape cassette 2 is ejected from the recording-reproducing apparatus, the tape loading mechanism starts a tape loading operation at the higher rotational frequency of the rotary head drum 1. In this case, it may need long time to determine to detect the dew condensation formed on the rotary head drum 1 if used the ordinary threshold of 3 Hz, and hence, the dew condensation may need quickly be determined at a higher threshold. However, if the rotational frequency of the rotary head drum 1 is set to be equal to or higher than 6 Hz when the tape cassette 2 is loaded on the recording-reproducing apparatus, the rotary head drum 1 may be in the decelerated state but not in the accelerated state. Thus, the rotational frequency at which the magnetic tape T contacts the rotary head drum 1 at 8 Hz is approximately 10 Hz. Therefore, the threshold condition for moving to step S4 or step S5 is the rotational frequency of 10 Hz. As a result, if the rotational frequency is equal to or higher than 10 Hz, the threshold for determining the presence or the absence of dew condensation is set to half the value of the rotational frequency of the rotation head drum 1 when the tape cassette is loaded.

The subsequent flowchart shown in FIG. 6 illustrates a main body of the dew condensation detection control where the presence of dew condensation is determined when the rotational frequency of the rotation head drum is equal to or less than the threshold. In this flowchart, the rotational frequency of the rotary head drum 1 is monitored while the magnetic tape is drawn to the position where the presence of dew condensation is detected. In the flowchart shown in FIG. 6., whether or not the rotational frequency of the rotary head drum 1 is equal to or less than the threshold is determined at step S6, and if the rotational frequency is equal to or less than the threshold, the current step moves to the flowchart showing when the dew condensation is detected in the later-described FIG. 8; and if the rotational frequency is neither equal to nor less than the threshold, the current step moves to the subsequent step S7.

At step S7, whether or not the magnetic tape T has been drawn to the dew condensation detection position (FIG. 2) is determined. If the magnetic tape T has not been drawn to the dew condensation detection position, the count of a timer 1 is incremented by one at step S8. Simultaneously, if the magnetic tape T has not been drawn to the dew condensation detection position within 0.6 second, the count of a timer 2 is incremented by two, and then the step moves back to the step S6.

If the magnetic tape T is determined as drawn to the dew condensation detection position at step S7, whether or not the rotational frequency of the rotary head drum 1 is equal to or less than the threshold is determined at step S9. If the rotational frequency is equal to or less than the threshold, the presence of dew condensation is determined and the step is moves to the flowchart of FIG. 8. If, on the other hand, the rotational frequency of the rotary head drum 1 is neither equal to nor less than the threshold the step moves to the next step S10.

At step S10, whether or not the count of the timer B is equal to or more than 50 (0.5 seconds) is determined. If the count of the timer 2 is neither equal to nor more than 50 (0.5 seconds), the count of the timer 1 is incremented by one at step S11. In addition, when the count of the timer 1 is equal to or more than 60 (0.6 seconds), the count of the timer 2 is incremented one and the step moves back to the step S9. If the count of the timer 2 is determined to be equal to or more than 50 (0.5 seconds) at step S10, the step moves to the next flowchart of FIG. 7.

The aforementioned flowchart shown in FIG. 6 represents a control flowchart in compliance with a low temperature and a high temperature. Specifically, in a low temperature circumstances, the magnetic tape is unloaded from the rotary head drum at a low frequency and the rotational frequency of the rotary head drum rotated by an inertial force is rapidly decreased. Thus, if the same duration as the detection time used in a normal temperature is provided for detecting dew condensation after the magnetic tape has been drawn to the dew condensation detection position, the rotational frequency of the rotary head drum may decrease to less than 3 Hz with the absence of dew condensation on the rotary head drum. Further, though not applied to the case of stucking the magnetic tape to the rotary head drum due to the presence of dew condensation, since the rotational frequency of the rotary head drum may be low without dew condensation or may drastically decrease under a low temperature, shorter time may be used for detecting dew condensation if compared to the detection time used in a normal temperature.

In the flowchart shown in FIG. 6, the timer 1 that counts time to conduct the tape loading operation and the timer 2 that counts time to detect dew condensation are set for adjusting the detection time. In this case, a standard time for the tape loading operation is set to within 0.6 seconds. If the count of the timer 1 exceeds 60 (0.6 seconds) before the magnetic tape is drawn to the dew condensation detection position, the loading speed is determined as slow, and hence the count of the timer 2 that counts the dew condensation detection time begins to increment twice as many counts as the normal counts (based on the out come of the experiment by actual machines).

In comparison to the tape loading in the low temperature condition, the tape loading operation is conducted at a high a speed under the high temperature condition, the rotary head drum is thus unlikely to stop. Therefore, as shown in the flowchart of FIG. 6, the timer 2 starts counting after the standard time of 0.6 seconds (timer 1 counts 60).

Then, when the count of the timer 2 exceeds 50 (0.5 second), the dew condensation detection is ended and the step moves to the next flowchart shown in FIG. 7.

In the subsequent flowchart shown in FIG. 7, if no dew condensation is present on the rotary head drum when determined the presence of dew condensation at the dew condensation detection position (FIG. 2), the tape loading operation is resumed. There may rarely occur dew condensation on the rotary head drum while the aforementioned reloading is conducted (process between FIG. 2 and FIG. 3).

This flow shows the step of detecting the presence of dew condensation at this timing.

In the flowchart shown in FIG. 7, after the tape loading operation is resumed to cause the rotary head drum 1 to start rotating at step S12. At the subsequent step S13, whether or not the rotational frequency of the rotary head drum 1 reaches equal to or more than 90% of a target rotational frequency (a rotational frequency of a corresponding machine). If the rotational frequency of the rotary head drum 1 is equal to or more than 90%, the dew condensation is determined to be absence on the rotary head drum 1, and tape ending processing is conducted (step S24).

If the rotational frequency of the rotary head drum 1 does not reach 90% of a target rotational frequency at step S13, whether or not the rotational frequency of the rotary head drum 1 becomes lower than the previous measurement at the subsequent step S14. If the rotational frequency of the rotary head drum 1 is not lower than the previous measurement, the count of the counter 1 is set to 0 at step S15. If, on the other hand, the rotational frequency of the rotary head drum 1 is lower than the previous measurement the count of the counter 1 is incremented by one and the step moves to the next step S17.

At the subsequent step S17, whether or not the highest rotational frequency record of the rotary head drum 1 is renewed is determined. If the record of the highest rotational frequency of the rotary head drum 1 is renewed at step S17, the count of the counter 2 is set to 0 at step S18. If the record of the highest rotational frequency of the rotary head drum 1 is not renewed, whether or not the record of the highest rotational frequency of the rotary head drum 1 is not renewed and whether the rotational frequency is the same as the previous measurement are determined at step S19. If the rotational frequency of the rotary head drum 1 is the same as the previous measurement, the count of the counter 2 is incremented by one; or if the rotational frequency of the rotary head drum 1 is not the same as the previous measurement, the count of the counter 2 is incremented by two at step S21.

At the subsequent step S23, whether the count of the counter 1 reaches equal to or more than 3 or the count of the counter 2 reaches equal to or more than 20 is determined. If the count of the counter 1 or the count of the counter 2 reaches the aforementioned numerical value, dew condensation is determined to be present on the rotary head drum 1 and the step moves to the later-described flowchart of FIG. 9. If the count of the counter 1 or the count of the counter 2 does not reach the aforementioned numerical value, dew condensation is determined to be absent on the rotary head drum 1 and the step moves to the subsequent step S23.

Finally, whether or not the tape loading operation has been completed at step S23. If the tape loading operation has not been completed, the step moves back to the step S13; and if the tape loading operation has been completed, the tape loading ending processing is conducted at the subsequent step.

The above-mentioned flowchart shown in FIG. 7 employs two types of changes in the rotational frequency of the rotary head drum as a detection condition for dew condensation. Specifically, the outcome of the experiment shows that there are two characteristics observed in the change of the rotational frequency of the rotary head drum when dew condensation is present on the rotary head drum during the reacceleration of the rotary head drum. The first characteristic is sudden deceleration due to stucking the magnetic tape to the rotary head drum. However, in this case, since the rotary head drum still attempts to accelerate, the rotary head drum will not decelerate drastically but re-accelerate after a short-time deceleration (the rotary head drum is capable of accelerating using tape slack caused by deceleration of the rotary head drum). The deceleration may be difficult to detect based on the threshold, however, can be detected by detecting consecutive decreases in the rotational frequency of the rotary head drum. Therefore, as shown in FIG. 7, based on the outcome of the experiment, three consecutive decreases in the rotational frequency of the rotary head drum is determined as the presence of the dew condensation (detected by the counter 1).

The second characteristic is repelling of the magnetic tape while attempting to stuck to the rotary head drum. When the rotational frequency of the rotary head drum is monitored in this condition, acceleration of the rotary head drum suddenly stops and the frequency of the rotary head drum is in short-term hunting state. In this state, the record of the highest rotational frequency of the rotary head drum is not renewed and the rotational frequency of the rotary head drum fluctuates between the two numerical values. However, when the rotational frequency of the rotary head drum reaches approximately 90% of the target rotational frequency, the acceleration of the rotational frequency may sometimes slow down, and the same numerical values may successively be obtained about 9 times (the precise measurement of the rotational frequency can only be obtained at 0.1 second after the rotational frequency of the drum reaches 50% of the regulated frequency, and substantially, merely rough measurements can be obtained while accelerating the drum, and thus this outcome is not a deviation). Thus, according to the flowchart shown in FIG. 7, in order to discriminate the aforementioned two types of conditions, the condition where the record of the highest rotational frequency is not renewed but the rotational frequency is the same as the previous measurement is weighted as "1", and the condition where the record of the highest rotational frequency is not renewed but the rotational frequency is different from the previous measurement (hunting) is weighted as "2". When the total of the counts exceeds 20, dew condensation is determined to be present on the rotary head drum (dew condensation detected by the counter 2).

Figure 8:
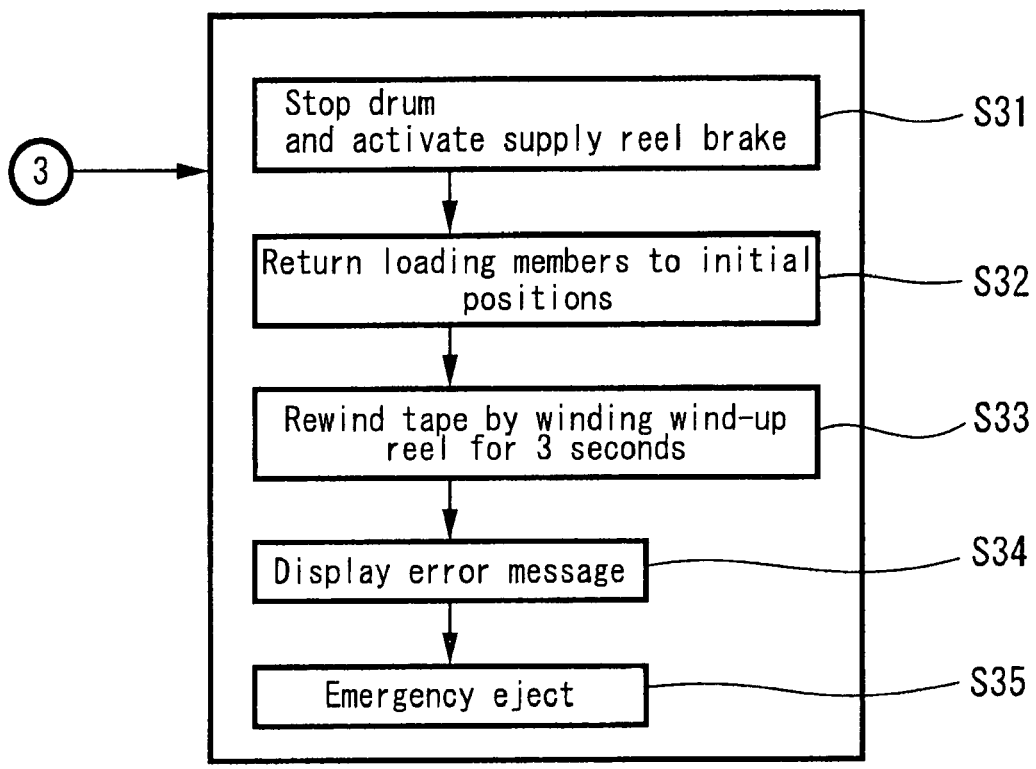
FIG. 8 is a flowchart showing a state when dew condensation in the rotary head drum in a recording-reproducing apparatus according to an embodiment of the present invention is detected in the flowchart of FIG. 6.

FIG. 8 represents a flowchart showing the steps, with which dew condensation is detected in the dew condensation detection flowchart shown in FIG. 6. Specifically, if dew condensation is detected at a position where the magnetic tape is drawn to the dew condensation detection position (position at which the magnetic tape slightly contacts with the rotary head drum) shown in FIG. 2, the magnetic tape can still be separated from the rotary head drum, and the following tape unloading operation will thus be conducted.

In the flowchart shown in FIG. 8, when dew condensation is detected, the rotation of the rotary head drum 1 is immediately stopped and a reel block brake of the supply reel 3 is activated at step S31, and thus magnetic tape T is no longer being drawn from the rotary head drum 1. Subsequently, the loading members 5, 6 are moved such that the loading members may return to the initial positions shown in FIG. 1 (step S32), and then the wind-up reel 4 is caused to rotate for about 3 seconds to rewind the magnetic tape T (step S33). The magnetic tape T is rewound after relocation of the loading members 5a, 6 so that the magnetic tape T will not come off the loading members 5, 6 when rewinding the magnetic tape T simultaneously with relocating the loading members 5, 6. Further, since the magnetic tape T stuck to the rotary head drum 1 is transferred to the side of the wind-up reel 4, the magnetic tape T can be prevented from being re-stuck to the rotary head drum 1 and easily separated from the rotary head drum 1 by winding up with the wind-up reel 4.

Having completed the tape unloading operation, an error message indicating the presence of the dew condensation is displayed on a display unit (step S34). Finally, an emergency eject (specific intermittent ejecting approach for handling errors) is performed by depressing an eject button, and hence the tape cassette 2 is ejected from the recording-reproducing apparatus (step S35).

Figure 9:
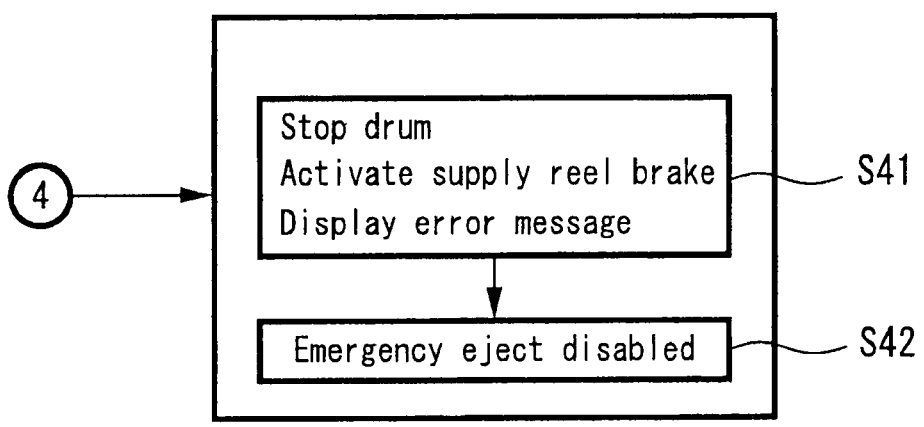
FIG. 9 is a flowchart showing a state when dew condensation in the rotary head drum in a recording-reproducing apparatus according to an embodiment of the present invention is detected in the flowchart of FIG. 7.

FIG. 9 represents a flowchart showing the steps, with which dew condensation is detected in the dew condensation detection flowchart shown in FIG. 7. Specifically, after having resumed the tape loading operation, if dew condensation is detected during the tape loading operation (process of tape loading operation from FIG. 2 to FIG. 3), since the magnetic tape T may not easily be separated from the rotary head drum 1, and thus the tape unloading operation can immediately be disabled.

In the flowchart shown in FIG. 9, when dew condensation is detected, the rotation of the rotary head drum 1 is immediately stopped and a reel block brake of the supply reel 3 is activated. In addition, an error message indicating the presence of the dew condensation is displayed on a display unit (step S41). All the tape loading mechanisms will then be terminated so that despite of depressing an eject button, the tape cassette 2 will not be ejected from the recording-reproducing apparatus, and thus an emergency eject is disabled (step S42). This attempts to inhibit the condition of the magnetic tape from further deterioration.

As described above, in the recording-reproducing apparatus according to the embodiments of the present invention, since dew condensation is detected in a multiplex manner, the dew condensation can be detected with a higher probability. Further, since the magnetic tape unloading operation is controlled in compliance with the conditions under which dew condensation is detected, damages to the magnetic tape and the rotary head drum can almost completely be prevented.

It should be understood by those skilled in the art that various modifications, combinations, sub-combinations and alterations may occur depending on design requirements and other factors insofar as they are within the scope of the appended claims or the equivalents thereof.

What is claimed is:

1. A magnetic recording-reproducing apparatus comprising:
 a rotary head drum around which a magnetic tape is wound for recording and reproducing signals on the magnetic tape,
 a tape loading mechanism including a tape loading operation that winds the magnetic tape around the rotary head drum and a tape unloading operation that unwinds the magnetic tape from the rotary head drum,
 a control unit for controlling rotation of the rotary head drum and operation of the tape loading mechanism;
 with the control unit including
 a monitoring unit that monitors rotational frequency of the rotary head drum at a tape loading operation,
 a first determination unit that determines the presence of dew condensation when rotational frequency of the rotary head drum is equal to or less than the prescribed value with a state where tape loading operation is conducted to a position at which the magnetic tape slightly contacts the rotary head drum,
 an operation unit that stops rotation of the rotary head drum when the operation unit determines the presence of dew condensation and that conducts the tape unloading operation using the tape loading mechanism,
 a second determination unit that resumes the tape loading operation using the tape loading mechanism when the first determination unit determines the absence of dew condensation and that determines the presence of dew condensation by periodically sampling decreasing rates of rotational frequency and renewal rates of the highest rotational frequency of the rotary head drum during the tape loading operation, and
 a stop control unit that stops rotation of the rotary head drum when the second determination unit determines the presence of dew condensation and that disables the tape unloading operation using the tape loading mechanism.

2. A method of detecting dew condensation for a magnetic recording-reproducing apparatus having a rotary head drum around which a magnetic tape is wound for recording and reproducing signals on the magnetic tape, a tape loading mechanism including a tape loading operation that winds the magnetic tape around the rotary head drum and a tape unloading operation that unwinds the magnetic tape from the rotary head drum, a control unit for controlling rotation of the rotary head drum and operation of the tape loading mechanism, comprising the steps of:
 monitoring rotational frequency of the rotary head drum at a tape loading operation,
 determining the presence of dew condensation when rotational frequency of the rotary head drum is equal to or less than the prescribed value with a state where tape loading operation is conducted to a position at which the magnetic tape slightly contacts the rotary head drum,
 stopping rotation of the rotary head drum when the operation unit determines the presence of dew condensation and that conducts the tape unloading operation using the tape loading mechanism,
 resuming the tape loading operation using the tape loading mechanism when the first determination unit determines the absence of dew condensation and determining the presence of dew condensation by periodically sampling decreasing rates of rotational frequency and renewal rates of the highest rotational frequency of the rotary head drum during the tape loading operation, and
 terminating rotation of the rotary head drum when the second determination unit determines the presence of dew condensation, and disabling the tape unloading operation using the tape loading mechanism.

* * * * *